United States Patent Office 3,000,929
Patented Sept. 19, 1961

3,000,929
O-(3-PHENYLCARBAZYL) SERINE
William Shive and Charles Gordon Skinner, Jr., Austin, Tex.
No Drawing. Filed Dec. 15, 1959, Ser. No. 859,583
1 Claim. (Cl. 260—472)

This invention relates to O-(3-phenylcarbazyl)serine of the formula

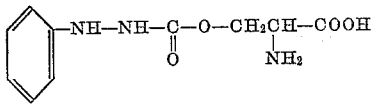
—NH—NH—C—O—CH$_2$CH—COOH
        ‖              |
        O              NH$_2$ This novel compound is prepared by reacting N-carbobenzoxy-DL-serine benzyl ester in a suitable organic solvent medium, such as toluene, with phosgene. The reaction is preferably carried out at a reduced temperature, such as 0–5° C. and over an extended period of time, such as about 15 to 20 hours. From the reaction mixture, the solvent is removed, conveniently under reduced pressure and with warming. The product then is preferably freed of residual phosgene and HCl gas by repeated addition and evaporation of benzene or other suitable solvent.

The resultant material is reacted, in a suitable solvent, such as ethanol, with phenylhydrazine, preferably in the form of a salt such as the hydrochloride, and preferably in the presence of aqueous sodium carbonate. The resultant product is hydrogenolyzed, using a suitable catalyst, if desired, and the O-(3-phenylcarbazyl)serine recovered by any convenient procedure.

The compound of this invention is useful as an antibacterial, inhibiting the growth, for example, of *Lactobacillus arabinosus* and *Streptococcus lactis*. It is well known in the bacteriological art that the latter organism is primarily responsible for souring raw milk. See "Principles of Microbiology," Carter and Smith (1954), page 549, and "Microbiology, General and Applied," Sarles and Frazier (1947), page 199. A 0.1% solution of this compound in water is useful as a rinse for dairy equipment.

The invention will be described in greater detail by the following specific example:

Example

A mixture of 6.6 g. of N-carbobenzoxy-DL-serine benzyl ester partially dissolved in 75 ml. of toluene was saturated with phosgene at 0–5° C. The reaction mixture was kept for 16 hours at room temperature in a rubber-stoppered flask to effect complete reaction. The solvent was removed under reduced pressure, with warming, to yield a pale yellow oil which was freed of residual phosgene and hydrogen chloride gas by repeated addition and evaporation with benzene. A solution of this oil was condensed with 4.32 g. of phenylhydrazine hydrochloride in 50 ml. of ethanol in the presence of 2.75 g. of sodium carbonate in 25 ml. of water to give 7.5 g. of a straw-colored solid, M.P. 100–103° C. A sample of the crude product when recrystallized from ethanol-water gave small white needles of O-(3-phenylcarbazyl)-N-carbobenzoxy-DL-serine benzyl ester, M.P. 110–112° C. A solution of 4.6 g. of the latter dissolved in 150 ml. of dioxane-ethanol (1:1) was treated with hydrogen gas for 6 hours at atmospheric pressure and room temperature in the presence of 0.7 g. of palladium black. The catalyst was filtered, washed with warm water and the combined filtrates were taken to dryness under reduced pressure with warming, to yield 2.1 g. of residual solid. The residue was recrystallized from methanol-water in several fractions to yield 1.8 g. of O-(3-phenylcarbazyl)-DL-serine, M.P. 220–222° C.

*Anal.*—Calcd. for C$_{10}$H$_{13}$N$_3$O$_4$: C, 50:20; H, 5.48. Found: C, 50:46; H, 5.68.

This application is a continuation-in-part of application Number 778,321, filed December 5, 1958, now abandoned.

The invention claimed is:

O-(3-phenylcarbazyl)serine.

No references cited.